United States Patent

[11] 3,568,002

| [72] | Inventors | Kenneth E. Robins<br>Moriches;<br>Richard B. Britton, Setauket, N.Y. |
|---|---|---|
| [21] | Appl. No. | 776,658 |
| [22] | Filed | Nov. 18, 1968 |
| [45] | Patented | Mar. 2, 1971 |
| [73] | Assignee | The United States of America as represented by the United States Atomic Energy Commission |

[54] MULTIACTION FLUX PUMP
3 Claims, 31 Drawing Figs.

[52] U.S. Cl. ............................................. 317/123
[51] Int. Cl. ............................................. H01h 47/00
[50] Field of Search ................................. 317/123; 335/216

[56] References Cited
UNITED STATES PATENTS
3,271,628  9/1966  Prior ........................ 37/123

Primary Examiner—Harold Broome
Attorney—Roland A. Anderson

ABSTRACT: System for efficiently and quickly energizing superconducting magnet coils with direct current from an inexpensive, alternating current power supply by multiaction flux pumping, wherein continuously superconducting switching, and air core transformer coils are used to convert alternating current into a substantially continuously increasing direct current in the magnet coils while substantially preventing the dumping of large amounts of energy into the cryogenic cooling fluid for maintaining the magnet coils in their superconducting state whereby high magnetic fields are efficiently produced and/or maintained in the magnet coils.

PATENTED MAR 2 1971  3,568,002

INVENTORS.
KENNETH E. ROBINS
BY RICHARD B. BRITTON

FLUX PUMP TO MAKE UP RESISTIVE LOSSES IN DC BEAM MAGNET

INVENTORS.
KENNETH E. ROBINS
BY RICHARD B. BRITTON

Fig. 13a 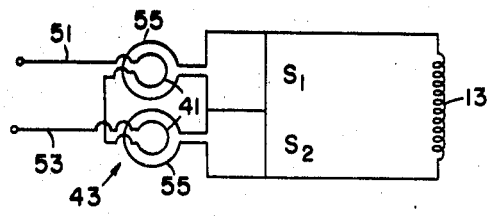 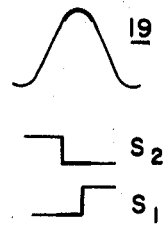 Fig. 13b
Fig. 14a 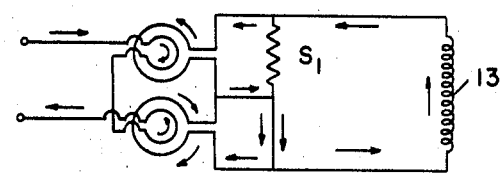 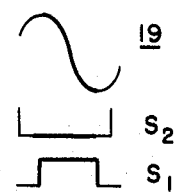 Fig. 14b
Fig. 15a 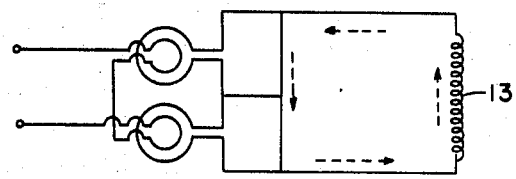 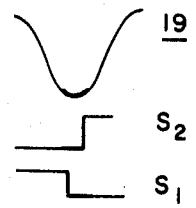 Fig. 15b
Fig. 16a 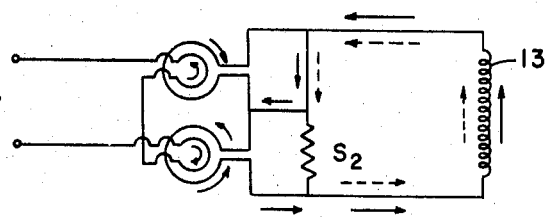 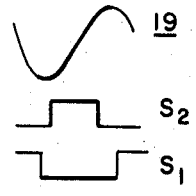 Fig. 16b
INVENTORS.
KENNETH E. ROBINS
BY RICHARD B. BRITTON 3,568,002

MULTIACTION FLUX PUMP

BACKGROUND OF THE INVENTION

1. Field of the Invention

This invention relates to superconducting magnets and more particularly to flux pump means for efficiently energizing such magnets for the efficient production of strong magnetic fields.

2. Description of the Prior Art

Various proposals have been made and used to energize superconductors for producing magnetic fields in superconducting magnets by the use of magnetic flux pumps, such as those described and shown in U.S. Pats. Nos. 3,150,291; 3,233,155; 3,244,943; 3,262,025; 3,277,322; and 3,320,522. While these arrangements have been useful and can accomplish the production of magnetic fields in superconducting magnets, they have required complicated or inefficient single-action switching systems, iron core magnets, and/or rotating mechanical elements that have been expensive, subject to wear, troublesome, or otherwise limited in their capabilities of their applications. It is additionally advantageous to provide double-action flux pumping for efficiently increasing or maintaining large magnetic fields in superconducting magnet coils substantially without wasting large amounts of energy.

SUMMARY OF THE INVENTION

The invention described herein was made in the course of, or under a contract with the United States Atomic Energy Commission.

This invention provides a particularly simple, inexpensive, efficient and trouble-free system for energizing superconducting coils for selectively producing, and/or maintaining magnetic fields up to 100 kilogauss or more. The method and construction involved in this invention utilize standard and well-known techniques and apparatus and are highly flexible for a wide range of applications and magnetic fields. More particularly this invention involves the use of first, second and third coils that are maintained in their superconducting state, and means for employing the current source substantially continuously for producing, maintaining and/or increasing direct currents in individual of said coils substantially without dumping large amounts of energy into the cooling fluid for maintaining the coils in their superconducting state. In one embodiment, this invention, comprises air core superconducting coils, comprising switching coils, magnet coils and closely coupled transformer coils, and double-action switching means that are substantially continuously employed in connection with an alternating current source and said switching coils for converting an alternating current from said source in said transformer coils into stored direct current in individual of said magnet coils. With the proper selection of components and interconnections, the proper method for the operation thereof, as described in more detail herinafter, the desired magnet coil energization is provided.

The above and further novel features of this invention will appear more fully from the following detailed description when the same is read in connection with the accompanying drawings. It is expressly understood, however, that the drawings are not intended as a definition of the invention but are for the purpose of illustration only.

BRIEF DESCRIPTION OF THE SEVERAL VIEWS OF THE DRAWING

FIG. 1b is a partial graphic illustration of a double-action flux pumping switching sequence for the apparatus of FIG. 1a;

FIG. 2b is a partial graphic illustration of the above-mentioned alternating wave signal and the resulting direct current switch signals employed during the portion of the sequence illustrated in FIG. 2a;

FIG. 3a is a continuation of the sequence illustrated in FIG. 2a;

FIG. 3b is a partial graphic illustration of the above-mentioned wave forms for the portion of the sequence illustrated by FIG. 3a;

FIG. 4a is a continuation of the sequence illustrated in FIG. 3a;

FIG. 4b is a partial graphic illustration of the above-mentioned wave forms for the portion of the sequence illustrated by FIG. 4a;

FIG. 5a is a continuation of the sequence illustrated in FIG. 4a;

FIG. 5b is a partial graphic illustration of the above-mentioned wave forms for the portion of the sequence illustrated by FIG. 4a;

FIG. 6a is a continuation of the sequence illustrated in FIG. 5a;

FIG. 6b is a partial graphic illustration of the above-mentioned wave forms for the portion of the sequence illustrated by FIG. 6a;

FIGS. 9a—11b and 13a—16b are partial sequential illustrations corresponding to the sequence of FIG. 2a—6b for other embodiments of this invention for substantially continuously energizing one magnet coil.

DETAILED DESCRIPTION

It is known that magnetic flux can be intermittently injected into a superconducting magnet coil, and the invention hereinafter described utilizes a double-acting flux pumping system for energizing a set of superconductor magnet coils of the type described in U.S. Pat. No. 3,356,976 to Sampson et al. As such, this invention is particularly useful in alternating gradient acceleration and transport system where quadrupole magnets are arranged in pairs for sequentially focusing charged particles in vertical and horizontal planes. Such focusing in vertical and horizontal planes is described in "The Strong-Focusing Synchrotron—A New High Energy Accelerator" by E. D. Courant, M. S. Livingston and H. S. Snyder, The Physical Review, Vol. 88, No. 5, pp 1190—1196, Dec. 1952. However, as described in more detail hereinafter, the systems and apparatus of this invention are useful in any system where superconducting magnet coils are required.

Figure 1A:
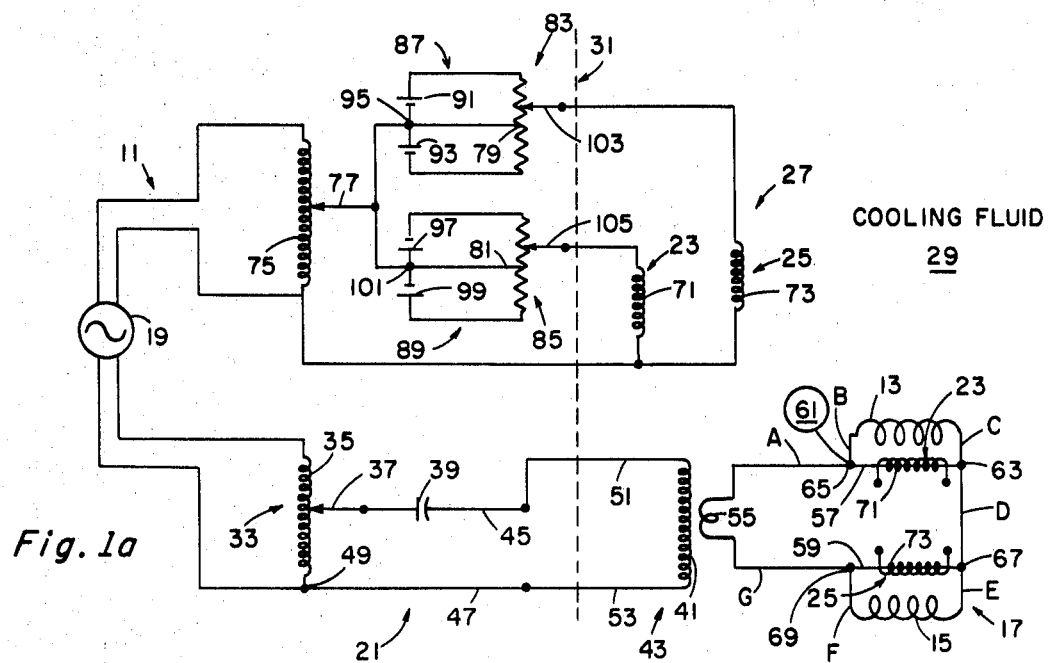
FIG. 1a is a partial schematic illustration of one embodiment of the double acting flux pumping system of this invention.

Referring now to FIG. 1a, the apparatus 11 of this invention produces correspondingly high fields in superconducting magnet coils 13 and 15, such as the superconducting magnet coils described in the above-referenced Sampson et al. patent. These magnet coils 13 and 15 are advantageously quadrupole magnets having their north and south poles rotated relatively by 90° for the focusing of charged particles in strong focusing system 17, but they may be paired superconducting solenoids, bending magnets or any other type of superconducting windings.

Power source 19 is conventional. One suitable source 19 is a wall socket, such as a standard 60 cycle, 110 volt source but, as will be understood in more detail hereinafter, this source 19 may be any standard AC source and may utilize single or multiple phases, high or low frequencies and/or high or low voltages. Advantageously, a single-phase source 19 energizes the coils 13 and 15 through a power circuit 21 and actuates switches 23 and 25 by means of a switching circuit 27. The result is that the source 19 is selectively, efficiently and substantially continuously utilized for producing, maintaining or increasing direct currents and correspondingly high fields in the focusing system 17 without dumping large amounts of energy into the cryogenic cooling fluid 29 in dewar 31 for keeping coils 13 and 15 in their superconducting state.

The mentioned power circuit 21 for energizing the magnet coils 13 and 15, comprises a variable transformer 33, such as variac, whose winding 35 has an adjustable wiper 37 connected to a capacitor 39, such as a 500 $\mu$f. condenser, for shifting the signal from source 19 by 75° to 85° in primary winding 41 of an air core superconducting transformer 43, as described in more detail hereinafter. The peak voltage in capacitor 39 is about 50 volts and the current in leads 45 and 47 from capacitor 39 to winding 41 and from winding 41 to end 49 of variable transformer 33 is only between 1 to 2 amperes whereby there is very little or no resistance heating in leads 45 and 47 even with 18—20 normal resistance copper wire of about 30 mils diameter. Also, small superconducting leads 51 and 53, such as 14 mil diameter copper coated Nb-Ti wire having varnish insulation thereon, can be used to connect leads 45 and 47 with primary winding 41. Advantageously winding 41 has 200 turns formed from the same wire for forming leads 51 and 53. Secondary winding 55 on the other hand, has only one turn inside winding 41 in transformer 43, and winding 55 is formed from standard ½ inches wide, copper-clad varnish insulated $Nb_3Sn$ ribbon. Also, this ribbon is continuous and is used to form superconducting coils 13 and 15 and the leads A, B, C, D, E and G therefor whereby this ribbon can easily carry 1,000 amps at 60 mv. in its superconducting state. It is understood, therefore, that there is little or no heat loss from the described superconducting coils or the leads therefor into the surrounding cryostatic cooling fluid 29 in dewar 31.

Switches 23 and 25 advantageously comprise straight wires 57 and 59 of superconducting material having a high normal resistance state, low critical field $H_c$ and a critical temperature $T_c$ somewhat greater than the coolant temperature which is about 4.2° K. One advantageous material for these wires 57 and 59 is a mixture of 30 percent tin and 70 percent lead, which has a critical field $H_c$ of only 600 gauss, a critical temperature of about 6° K., and a normal resistance 10 to 100 times higher than pure lead. The described wire material for the switches 23 and 25 compares with a critical field $H_c$ of 803 gauss and a $T_c$ of 7.2° K. for lead and a critical field of 305 gauss and a $T_c$ of 3.74° K. for white tin. Wires 57 and 59 may alternately be copper plated Nb-Ti that is suitably heat treated to diffuse Nb-Ti into the copper, or any other material having the desired high normal resistance, low critical temperature $T_c$ corresponding in these respects with the above-mentioned 30 percent tin, 70 percent lead mixture. As indicated by test AC voltmeters 61 at junctions 63, 65 67 and 69, the switches 23 and 25 are actuated in the proper sequence to produce 60 mv. across switch 23 between junctions 63 and 65, and 60 mv. across switch 25 between junctions 67 and 69.

In understanding the operation of switches 23 and 25, switching wires 57 and 59 in power circuit 21 respectively connect the ends of magnet coils 13 and 15. Also, respective separate continuously superconducting switching coils 71 and 73, which are connected to source 19 in switching circuit 27, selectively cause wires 57 and 59 to change from their normal to superconducting states to open and close circuits described in more detail hereinafter in the power circuit 21. To this end, the switching coil 71 is energized by an increasing current from source 19 to produce a magnetic field above the critical field $H_c$ of wire 57 whereby the wire 57 goes into its normal resistance state. Thereafter, as the current from source 19 decreases in switching coil 71, the wire 57 returns to its superconducting state. Likewise, the increasing and decreasing current from source 19 in switching coil 73 causes wire 59 sequentially periodically to change back and forth from its superconducting state to its normal resistance state. For example, the current in switching coils 23 and 25 increases and decreases sinusoidally in the proper sequence to produce a field therein from 0 to 6 kilogauss during which time switching wires 57 and 59 are respectively superconducting and from 0.6 to 1.6 kilogauss during which time wire 57 or 59 are in their normal resistance state.

The switching circuit 27 for actuating switching coils 71 and 73 in the proper sequence, comprises a variable transformer, such as a variac 75 connected to source 19, and a wiper 77 connected in parallel to the center taps 79 and 81 of potentiometers 83 and 85. The wiper 77 is also connected in parallel to two bias sources 87 and 89, comprising two 3-volt batteries 91 and 93 that are connected oppositely across junction 95 and potentiometer 83, and two 3-volt batteries 97 and 99 that are oppositely connected across junction 101 and potentiometer 85.

Figure 1B:
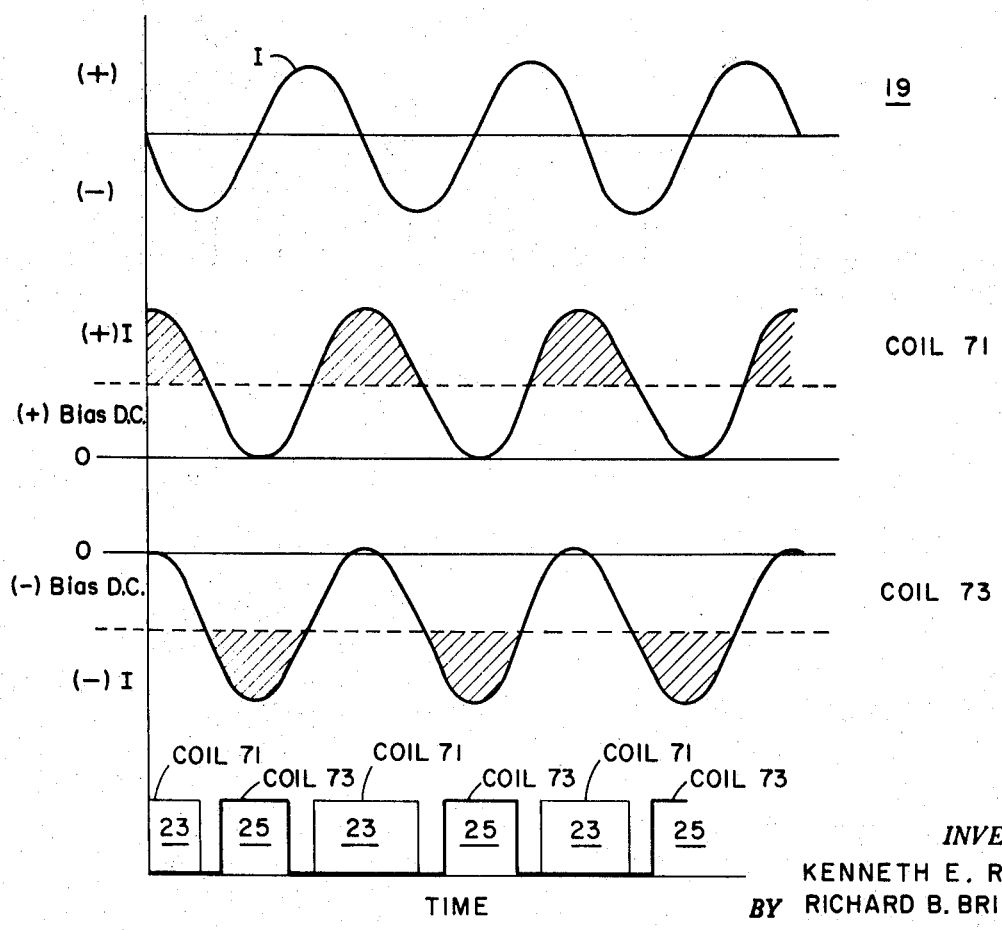
Figure 1C:
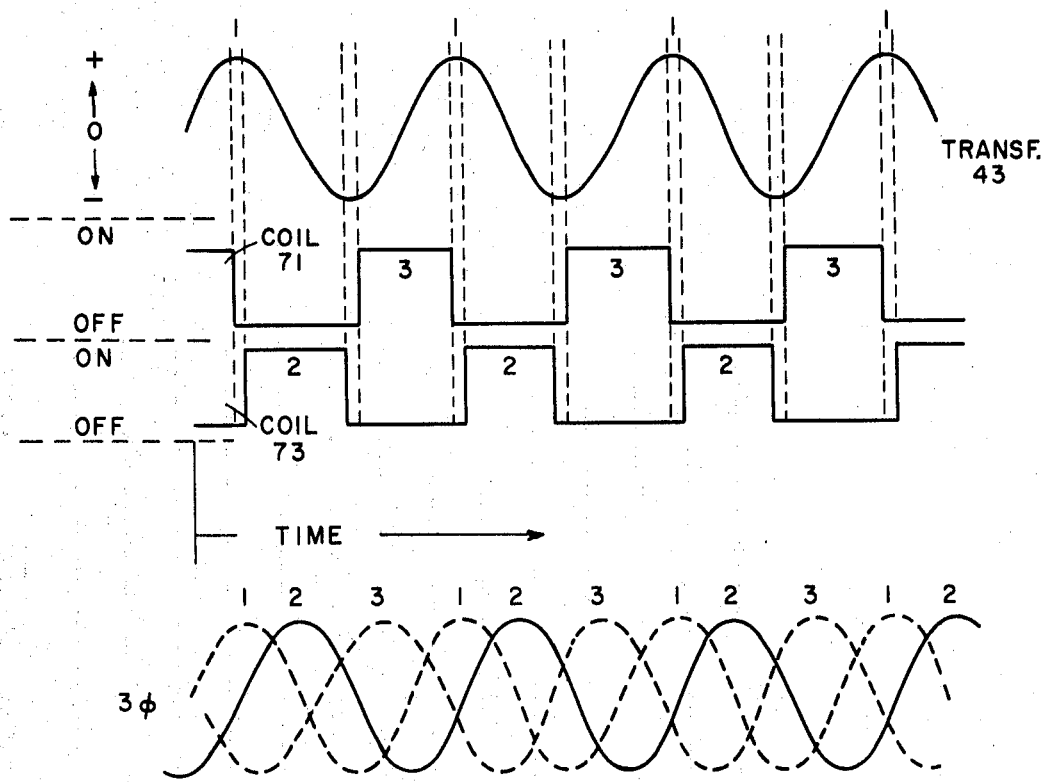
FIG. 1c is a partial graphic illustration of the power cycle vs the switching cycle of FIG. 1b.

The desired phase and amplitude relationship of the biasing source 87 and 89 will be understood with reference to FIG. 1b. As illustrated therein, the power received by transformer 43 from source 19 is approximately 80° out of phase with respect to the current in switching coils 71 and 73. However, the currents in switching coils 71 and 73, while in phase with each other, are biased oppositely whereby the superconductive and resistive states of switching wires 57 and 59 substantially alternate. Thus switching coil 71 is biased positively to produce a 0.6 kilogauss field along the dotted lines shown in FIG. 1b and switching coil 73 is biased negatively to produce a .6 kilogauss field along the dotted line shown in this FIG. 1b. This has the effect that while the signal to the two switching coils is the same in amplitude and phase, the switching of wires 57 and 59 operate with their resistive and superconductive states 180° out of phase. As shown in FIG. 1b, therefore, the current in switching wires 57 and 59 corresponds to the direct current, square wave-shaped signals shown in this FIG. 1b. This has the significant result of substantially, continuously utilizing the AC power cycle of source 19 to increase the stored energy in focusing system 17 as illustrated in FIG. 1c. As shown in FIG. 1c, the sinusoidal line at the top of the FIG. represents the power cycle of source 19 and the centrally located square waves illustrate the corresponding switching cycle of switches 23 and 25.

It will also be understood that the bottom lines of FIG. 1c illustrate an overlay of a three-phase 60 Hertz power cycle. In this regard, although the described single phase is preferred, by applying all three phases as illustrated, they can be utilized in operating suitable switches properly. To reverse the pumping action the switch lines of the 3Φ line are reversed. In any event, the bottom of variac 75 is connected in parallel with the switching coils 71 and 73 and in a circuit, comprising wiper 77, potentiometers 83 and 85, and switching coils 71 and 73. The potentiometers 83 and 85 thus provide a suitable bias for switching coils 71 and 73 through wipers 103 and 105 to produce the desired maximum peak voltages in the proper sequence across switch wires 57 and 59 between junctions 63 and 65 and junctions 67 and 69.

In operation, the described magnet coils 13 and 15, the primary and secondary windings 41 and 55 of transformer 43, and the switching coils 71 and 73 are all maintained in their superconducting state since only a small amount of power is applied from source 19 to magnet coils 13 and 15 and switching coils 71 and 73. To this end a single control adjusts the positions of wipers 37 and 77 on variacs 33 and 75 to receive equal small voltages in each wiper. Next, direct current bias is applied to both switches 23 and 25 by adjusting the positions of wipers 103 and 105 whereby the AC signal from source 19 in switching coils 71 and 73 is combined with the DC voltages from bias sources 87 and 89 in switching coils 71 and 73. This causes the switches 23 and 25 to open and close in the correct sequence continuously to increase the stored energy from source 19 in focusing system 17.

Figure 2A:
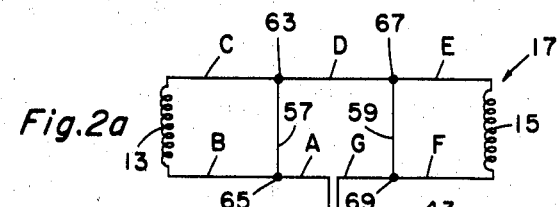
FIG. 2a is a partial schematic illustration of a portion of the double-acting flux pumping sequence of FIG. 1b.
Figure 2B:
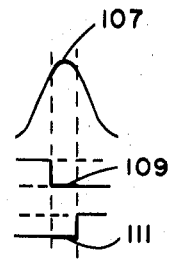
Figure 3A:
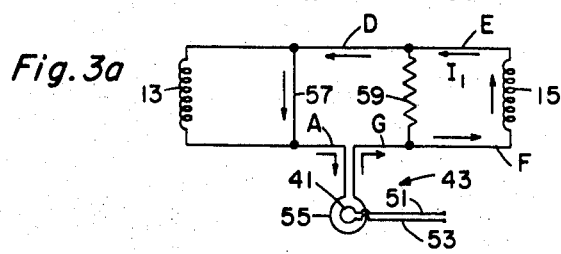
Figure 3B:
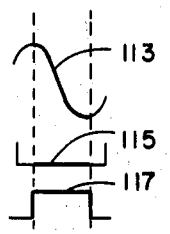
Figure 4A:
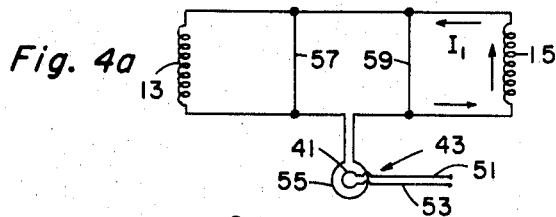
Figure 4B:
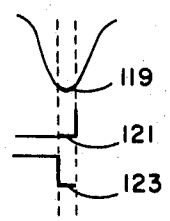

One typical sequence is illustrated in FIGS. 2a—5b. As shown in FIGS. 2a and 2b, the source 19 applies a first peak power signal 107 to transformer 43 when both switches 23 and 25 are closed, i.e. wires 57 and 59 are in their superconducting state with wire 57 just starting in its superconducting mode and conducting a constant current illustrated by signal 109, and wire 59 just ending its superconducting mode and conducting a constant current illustrated by signal 111. During the next portion of this sequence, which is illustrated in FIGS. 3a and 3b, the source 19 applies a decreasing power signal 113 to transformer 43 when switch 23 is closed and switch 25 is open, i.e. when wire 57 is superconducting and wire 59 is resistive. During this portion of the sequence the signals in switching wires 57 and 59 are illustrated by reference numbers 115 and 117 in FIG. 3b. This causes current $I_1$ to be induced in the circuit, comprising, secondary winding 55, magnet coil 15 and leads A, D, E, F and G. As the negative peak in this signal 113 is approached, switch 25 closes while switch 23 remains closed, as illustrated in FIGS. 4a and 4b, wires 57 and 59 thus being both superconductive, whereby the current $I_1$ is trapped in the circuit comprising wire 59 and magnet coil 15 and leads B and F. This is because this current $I_1$ preferentially flows in the path comprising magnet coil 15 and wire 59 rather than in any other paths, such as secondary winding 55 and magnet coil 13, magnet coils 13 and 15 and secondary coil 43, and/or secondary winding 55, wires 57 and 59 and superconducting lead D connecting the opposite ends of magnet coils 13 and 15 at junctions 63 and 67. During this portion of the sequences, the signals 121 and 123 in switching wires 57 and 59 and the power signal 119 in transformer 43 are as shown in FIGS. 4b and 4a.

Figure 5A:
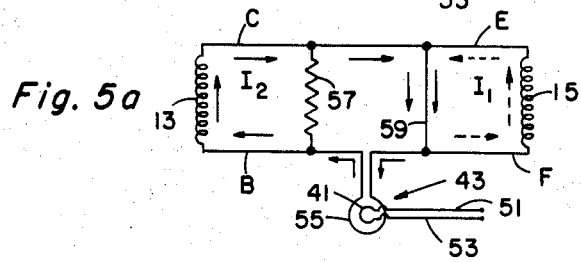
Figure 5B:
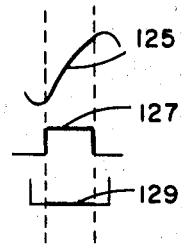

In the next portion of the sequence, illustrated in FIGS. 5a and 5b, switch 23 opens and switch 25 closes, i.e. wire 59 is superconducting and wire 57 is resistive. Thereupon, source 19 applies a signal 125 to transformer 43 as illustrated in FIG. 5a to produce a current $I_2$ in the circuit, comprising coil 13, secondary winding 55, leads A, B, C, D, G and switching wire 59, while the current $I_1$ continues to flow in the circuit, comprising coil 15, leads E and F and switching wire 59. During this portion of the sequence the switching circuit 27 produces signals 127 and 129 in switching wires 57 and 59, as illustrated in FIG. 5b.

Figure 6A:
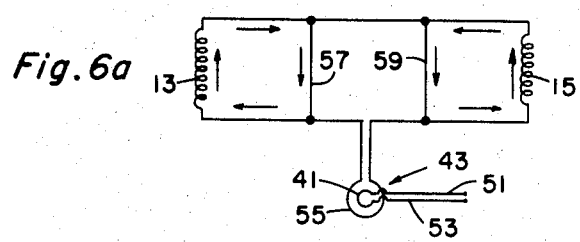
Figure 6B:
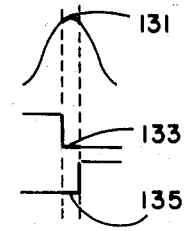

Finally, switches 23 and 25 open to trap current $I_2$ in the circuit, comprising coil 13 leads B and C, and switching wire 57 while the current $I_1$ remains trapped in the circuit, comprising coil 15, leads E and F and switching wire 59. During this portion of the sequence, the signal 131 in switching wires 57 and 59 are illustrated in FIG. 6b. Thereupon, the circuit illustrated in FIG. 1a is ready for the beginning of the next and further cycles in new sequences like the one illustrated in FIGS. 2a—6b.

Figure 7:
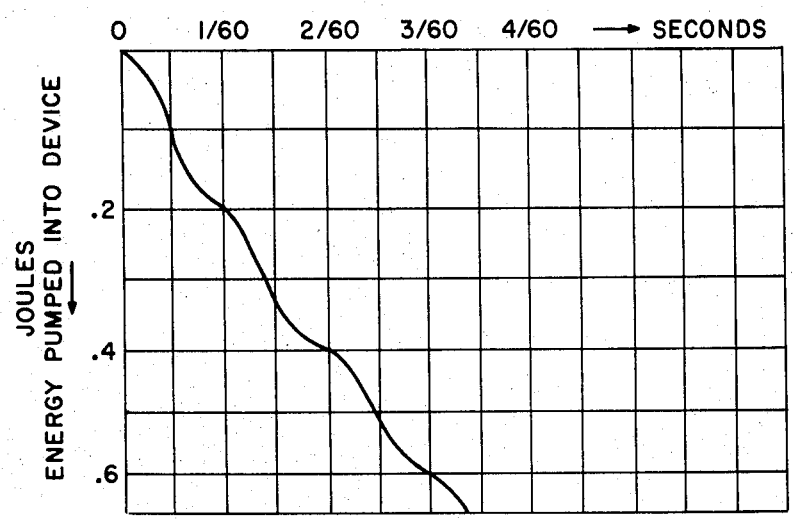
FIG. 7 is a graphic illustration of the substantially continuously increasing storage of direct current and increasing magnetic field produced by the double-flux pumping system of this invention.

In each subsequent cycle the current $I_1$ is increased an amount corresponding to the amplitude of the signal 113 and the current $I_2$ is increased a like amount corresponding to the amplitude of signal 125. Thus the energy of alternating current signal transferred to transformer 43 is substantially continuously utilized for transferring and converting this energy to direct current in coil 13 during substantially one half cycle of the alternating current signal from source 19, and the same likewise is done in coil 15 substantially during the other half cycle of the alternating current signal from source 19. Thus, the direct current energy stored in focusing system 17 substantially continuously increases, as illustrated in FIG. 7.

It is understood from the above that this invention can be used to produce a wide variety of magnetic field configurations and field strengths from 0 to 100 kilogauss or more, or to maintain such fields in superconducting magnets. In regard to the latter, superconducting magnets theoretically maintain their magnetic fields indefinitely but in many practical systems having brazed or soldered junctions or in which flux jumps occur, small resistances may develop that slowly tend to reduce the currents and fields produced therein. Accordingly, the system of this invention is advantageously used at periodic intervals for short periods of time to replace the stored energy in the magnets lost due to such resistances and/or flux jumps and to do so without adding flux jumps that quench the field produced by the magnets.

Figure 8:
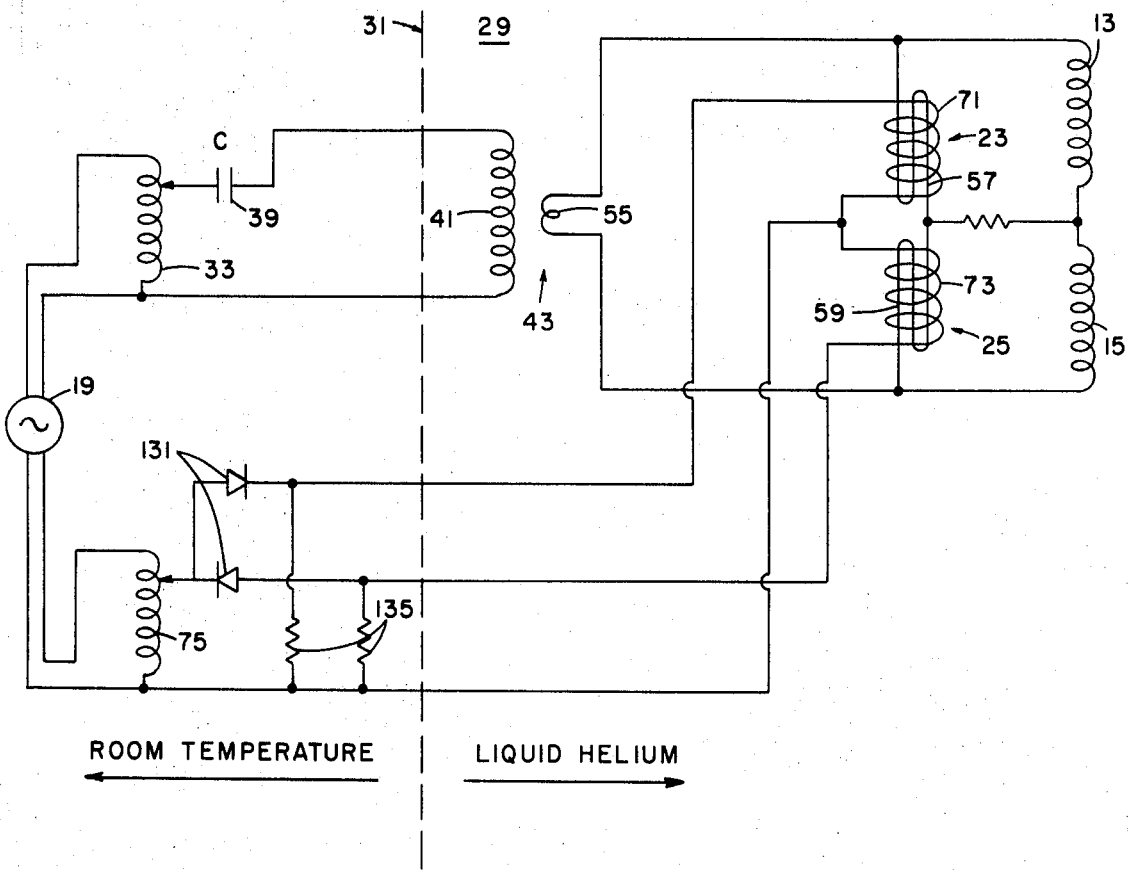
FIG. 8 is a partial schematic view of another embodiment of this invention.
Figure 9A:
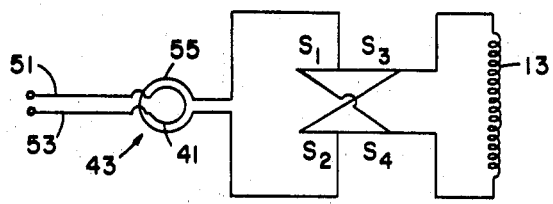
Figure 9B:
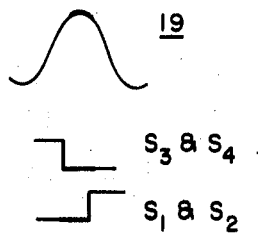
Figure 10A:
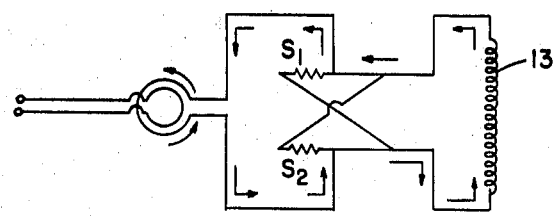
Figure 10B:
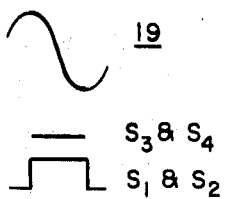
Figure 11A:
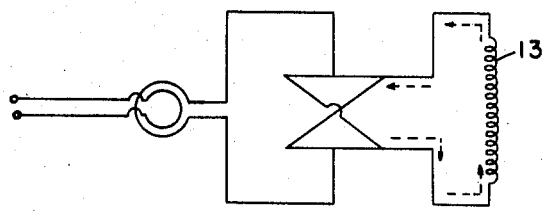
Figure 11B:
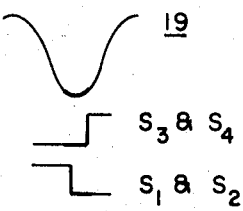
Figure 12A:
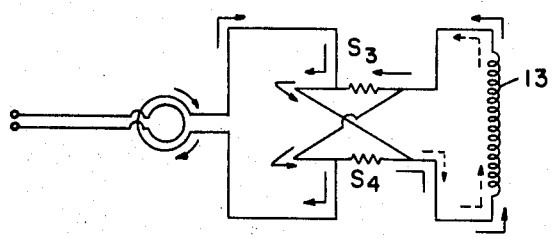
Figure 12B:
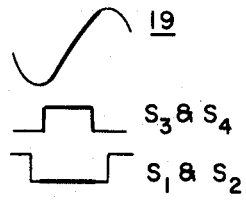

In another actual embodiment particularly adapted to this latter above-mentioned end, and which operates from 60 Hz. from a three-phase line, or advantageously from single phase, reference is made to FIG. 8. The cold part of the pump contains the three above-described parts; namely an air core stepdown transformer 43 of ratio 120 to 1, and two identical switches 23 and 25 that operate magnetically with no moving parts.

Operation is as follows: An autotransformer (variac) 33 is used to control AC which is applied through a capacitor 39 to the transformer 43. The capacitor provides 70 to 80° of phase shift in the current flow in the transformer primary 41. The secondary 55 of the transformer has the two switch elements, as described above, connected in series across it. The superconducting magnet 13 and 15 are placed in parallel with each switch element. Each switch element is a length of fine multistranded soft superconductor (such as described above). The element can carry the full magnet current with no field around it, but is fully switched when immersed in a field line of 600 to 2,000 gauss. Each switching field is produced by a 1-bore air core solenoid 71 or 73 made of Nb-48Ti wire with extra spacing for helium flow. The solenoids are capable of cycling 0 to 10 kg. at a 60 Hz. rate (operating biased) but in switching use, 0 to 1.5 kg. is about optimum. The switch magnets are driven in parallel from a second autotransformer 75. Each coil, however, has a diode 131 in its circuit to bias it in one direction. A damping resistor 135 is used across each coil to smooth out the diode action. The diodes are bucking so that the coils operate 180° out of phase. The total phasing is such that as one switch is energized and resistive, the transformer is drawing flux from space across the resistive element and into the SC circuit. On the next half cycle, the first switch becomes SC and the second switch resistive. The transformer is now on the opposite swing to that it forces the flux through the second switch element into the magnet.

In normal operation, the switch drive is adjusted with an oscilloscope to the point where the elements return completely to SC between cycles. The pumping rate is then fully adjustable with the transformer input control. To put the load, or magnet, into a persistent mode, the switches and transformer drive are turned to zero.

Two pumps of this type have been made. The first produced 1.5 watts and was able to drive a 103 kg.—1-inch bore magnet normal, with a final current of 119 amperes. The second pump has larger switches and pumps at a 5 watt maximum rate. Since a very small (approx. ½watt) pump will be used with each beam magnet, and only to counteract resistive joint losses, this efficiency is quite satisfactory.

It is also understood in accordance with this invention that one or more magnets may be used either alone or in parallel with magnets 13 and/or 15, and to this end suitable transformer coils and/or switches, like those described above, are suitably arranged in accordance with the teachings of this invention. To this end four switches $S_1$, $S_2$, $S_3$ and $S_4$ may be used for one magnet coil 13 as shown in FIGS. 9a—16b.

Additionally, it is understood in accordance with this invention that various conventional AC power sources may be used with any of a variety of frequencies, voltages, phases and/or currents in the production of large magnetic fields.

Finally, it will be be understood from the above that this invention can be used to pump magnetic fields up or down by simply changing the connection of the AC power source or by reversing the direction of the respective biasing means from positive to negative.

This invention has the advantage of efficiently producing and/or maintaining direct current magnetic fields in superconductors up to 100 kilogauss or more by selectively substantially continuously utilizing the whole power supply cycle of conventional alternating current power sources without wasting large amounts of energy. The system of this invention, moreover, is easy and inexpensive to construct, is easy to control and operate and utilizes conventional components for the rapid double-action flux pumping of superconducting magnets at high or low frequencies. Additionally, in one embodiment, this invention contemplates an efficient means for energizing alternating gradient magnets for charged particle transport systems. However, this invention may alternately be advantageously employed with a wide variety of magnets, solenoids or other superconducting coils for producing a wide range of magnetic fields in any of a large number of magnets.

We claim:

1. Double acting flux pumping apparatus (11) for selectively maintaining equal and opposite currents and resultant magnetic fields in superconductor magnets (13 and 15), comprising superconductor magnets having at least two coils forming four coil ends (B, C, E and F) and junctions (63, 65, 67 and 69), superconductors (A, 55, D and G) connecting said junctions and coils in series in a first current loop formed with a separate single-turn inductor (55) for injecting current into said coils, and means connecting respective of said junctions to form with each of said coils second and third spaced apart superconductor current loops in series with said first current loop and superconductor elements (57 and 59) for alternately, oppositely opening and closing said second and third current loops for continuously, sequentially, injecting oppositely circulating, equal and opposite, unidirectional currents into said coils through said inductor for selectively maintaining the current in said coils, alternating current power source means (19) for producing a continuously, rapidly, smoothly and periodically cycling alternating current having a first circuit responsive thereto for inducing alternating currents of opposite polarity in said inductor at a first phase for injecting said unidirectional currents into said coils, and a second circuit responsive to said alternating current for sequentially, alternately, oppositely actuating said superconductor elements at a different phase but in correspondence with the polarity of said alternating currents in said inductor and said unidirectional currents in said coils for sequentially, alternately, oppositely opening and closing said second and third current loops in correspondence with the polarity of said alternating currents but differing in phase therefrom, whereby said alternating current power source means actuates said first and second circuits to inject said unidirectional currents into said coils for selectively producing and maintaining equal and opposite magnetic fields in said coils, and controls the same for substantially continuously, selectively and efficiently supplying the current for maintaining the magnetic fields in said coils during all cycles of said alternating current.

2. The invention of claim 1 in which said first circuit, which is responsive to said alternating current power source means, has a capacitor (39) and a coil (41) inductively coupled to said inductor (55) for inducing alternating currents of opposite polarity in said inductor at said first phase, which is different from the phase of said actuation of said superconductor elements by said second circuit, and said second circuit is responsive to said same alternating current power source for sequentially opening and closing said second and third current loops at said different phase, whereby the difference in said phases is 75° to 90°.

3. The invention of claim 1 having cryostatic cooling means (29 and 31) for cooling said magnets, superconductors, superconductor elements, and inductor to superconducting temperatures, and wherein said second circuit has winding means responsive to said alternating current for providing increasing and decreasing magnetic fields that are 180° out of phase in correspondence with the phase and amplitude of said current from said alternating current source means for causing said superconductor elements (57 and 59) periodically, sequentially and oppositely to alternate between resistive and superconducting states for opening and closing said second and third current loops, said alternating current source means being in operable association with said current loops for selectively reversing the polarity and decreasing said magnetic fields in said coils, for preventing dumping large amounts of energy into said cryostatic cooling means and for preventing flux jumps in said magnet means.